(12) United States Patent
Larson

(10) Patent No.: US 12,102,035 B1
(45) Date of Patent: Oct. 1, 2024

(54) AUTONOMOUS ZERO-TURN MOWER KIT

(71) Applicant: Leroy Wilbur Larson, Berlin, WI (US)

(72) Inventor: Leroy Wilbur Larson, Berlin, WI (US)

( * ) Notice: Subject to any disclaimer, the term of this patent is extended or adjusted under 35 U.S.C. 154(b) by 0 days.

(21) Appl. No.: 18/594,129

(22) Filed: Mar. 4, 2024

Related U.S. Application Data

(60) Provisional application No. 63/492,272, filed on Mar. 27, 2023.

(51) Int. Cl.
| | | |
|---|---|---|
| *A01D 34/00* | (2006.01) | |
| *A01D 69/02* | (2006.01) | |
| *A01D 75/18* | (2006.01) | |
| *A01D 101/00* | (2006.01) | |
| *G05D 1/222* | (2024.01) | |
| *G05D 1/248* | (2024.01) | |
| *G05D 1/622* | (2024.01) | |
| *G05D 105/15* | (2024.01) | |
| *G05D 107/20* | (2024.01) | |

(52) U.S. Cl.
CPC ........... *A01D 34/008* (2013.01); *A01D 69/02* (2013.01); *A01D 75/18* (2013.01); *G05D 1/222* (2024.01); *G05D 1/248* (2024.01); *G05D 1/622* (2024.01); *A01D 2101/00* (2013.01); *G05D 2105/15* (2024.01); *G05D 2107/23* (2024.01)

(58) Field of Classification Search
CPC .................................................... A01D 34/008
See application file for complete search history.

(56) References Cited

U.S. PATENT DOCUMENTS

| | | | | |
|---|---|---|---|---|
| 2019/0075724 A1* | 3/2019 | Becke | .................. | A01D 34/006 |
| 2023/0042867 A1* | 2/2023 | Degnan | ................ | A01D 34/863 |
| 2023/0263093 A1* | 8/2023 | Suffolk | ................. | H02J 7/0044 |
| | | | | 701/23 |

FOREIGN PATENT DOCUMENTS

| | | | | |
|---|---|---|---|---|
| JP | 2020089336 A | * | 6/2020 | |
| WO | WO-2020124484 A1 | * | 6/2020 | ........... A01D 34/008 |

* cited by examiner

*Primary Examiner* — Imran K Mustafa
(74) *Attorney, Agent, or Firm* — Luedeka Neely, P.C.

(57) ABSTRACT

An autonomous mower conversion kit and method for autonomously controlling a zero-turn mower. The conversion kit include a vehicle control unit containing a navigation processor in data communication with one or more global positioning (GPS) devices configured for inputting GPS coordinates to the navigation processor. The navigation processor is configured to send a signal to a pair of high torque servo motors attached to a housing of a mower. Each of the pair of high torque servo motors has a tie rod removably attached on a first end to one of the pair of high torque servo motors and on a distal end to a mower steering arm. A safety override switch is connected to the vehicle control unit and is configured for converting the mower to autonomous control.

19 Claims, 11 Drawing Sheets

AUTONOMOUS ZERO-TURN MOWER KIT

RELATED APPLICATION

This application claims priority to provisional application Ser. No. 63/492,272, filed Mar. 27, 2023.

TECHNICAL FIELD

The disclosure is directed to an autonomous lawn mower and in particular to a kit that is primarily designed to attach to a mower, particularly a "zero-turn" mower to convert the mover to an autonomous mower.

BACKGROUND AND SUMMARY

Autonomous mowers exist, however, the mechanism for an autonomous mower is specifically configured for a particular mower and cannot be used on any other mower such as "zero-turn" mower. Many, if not all, of the autonomous mower systems for mowers control the wheels through a gear system that is built into the autonomous mower. The autonomous system is configured for a specific mower and cannot typically be used with a mower of a different design. What is needed is a simple, yet effective control system that can be used on any "zero-turn" mower to convert the mower to an autonomous mower.

In view of the foregoing, there is provided a kit that includes all of the components that are needed to convert almost any zero-turn mower, regardless of the mower design, into an autonomous mower.

In one embodiment there is provided an autonomous mower conversion kit including a vehicle control unit containing a navigation processor in data communication with one or more global positioning (GPS) devices configured for inputting GPS coordinates to the navigation processor. The navigation processor is configured to send a signal to a pair of high torque servo motors attached to a housing of a mower. Each of the pair of high torque servo motors has a tie rod removably attached on a first end to one of the pair of high torque servo motors and on a distal end to a mower steering arm. A safety override switch is connected to the vehicle control unit and is configured for converting the mower to autonomous control.

In another embodiment there is provided a method for autonomously controlling a zero-turn mower The method includes attaching an autonomous mower conversion kit to the zero-turn mower, the autonomous mower conversion kit includes a vehicle control unit containing a navigation processor in data communication with one or more global positioning (GPS) devices configured for inputting GPS coordinates to the navigation processor. The navigation processor is configured to send a signal to a pair of high torque servo motors attached to a housing of a mower. Each of the pair of high torque servo motors has a tie rod removably attached on a first end to one of the pair of high torque servo motors and on a distal end to a mower steering arm. A safety override switch is connected to the vehicle control unit and is configured for converting the mower to autonomous control. A mower route is planned and input to the vehicle control unit. A safety override switch is activated and the mower is turned on. Finally, the mower is set for autonomous control.

In some embodiments, the tie rod is removably attached on the first end to the high torque servo motor using a removable pin and cotter pin.

In some embodiments, a cellular module is provided in data communication with a command module in the vehicle control unit, wherein the cellular module is configured for inputting mowing instructions to the navigation processor from anywhere in the world.

In some embodiments, a radio module is provided in data communication with a command module in the vehicle control unit, wherein the radio module is configured for inputting mowing instructions to the navigation processor from the command module when located within range of the radio module.

In some embodiments, a USB port is connected to the vehicle control unit, wherein the USB port is configured for reading and inputting programming information to a command module in the vehicle control unit.

In some embodiments, the safety override switch is electrically connected to a mower shutdown system, wherein the safety override switch is configured to prevent the mower from shutting down when a user is not seated on the mower.

In some embodiments, the autonomous mower conversion kit further includes at least two GPS devices positioned on opposite ends of the mower having inputs to the command module.

In some embodiments, the autonomous mower conversion kit further includes an obstacle avoidance system having an input to the command module.

In some embodiments, the pair of high torque servo motors are configured to be removably attached to the housing of the mower.

The autonomous mower conversion kit is specifically designed to be used on any zero-turn mower regardless of the manufacturer. A unique feature of the autonomous mower conversion kit is the ability to easily convert the mower to manual control by simply removing cotter pins on the tie rods attached to the high torque servo motor. The entire system can be permanently or temporarily mounted to a housing for the mower and uses the mower power source for the control system with minimal hole drilling and part attachment. The kit allows for the manual functionality of the mower to remain intact. The design of autonomously controlling the steering arms allows for installation on almost any zero-turn mower. The following images and descriptions provide various aspects of the autonomous mower kit.

DETAILED DESCRIPTION

For the purposes of this disclosure the following terms are defined.

A "zero-turn" mower means a standard riding lawn mower with a turning radius that is effectively zero when the two drive wheels rotate in opposite directions.

"CORS" means continuously operating reference station.

"GNSS" means global navigation satellite system.

"NTRIP" means networked transport of RTCM via internet protocol.

"RTCM" means radio technology commission for maritime services.

"RTK" means real time kinematic positioning.

"VRS" means virtual reference station.

Figure 1:
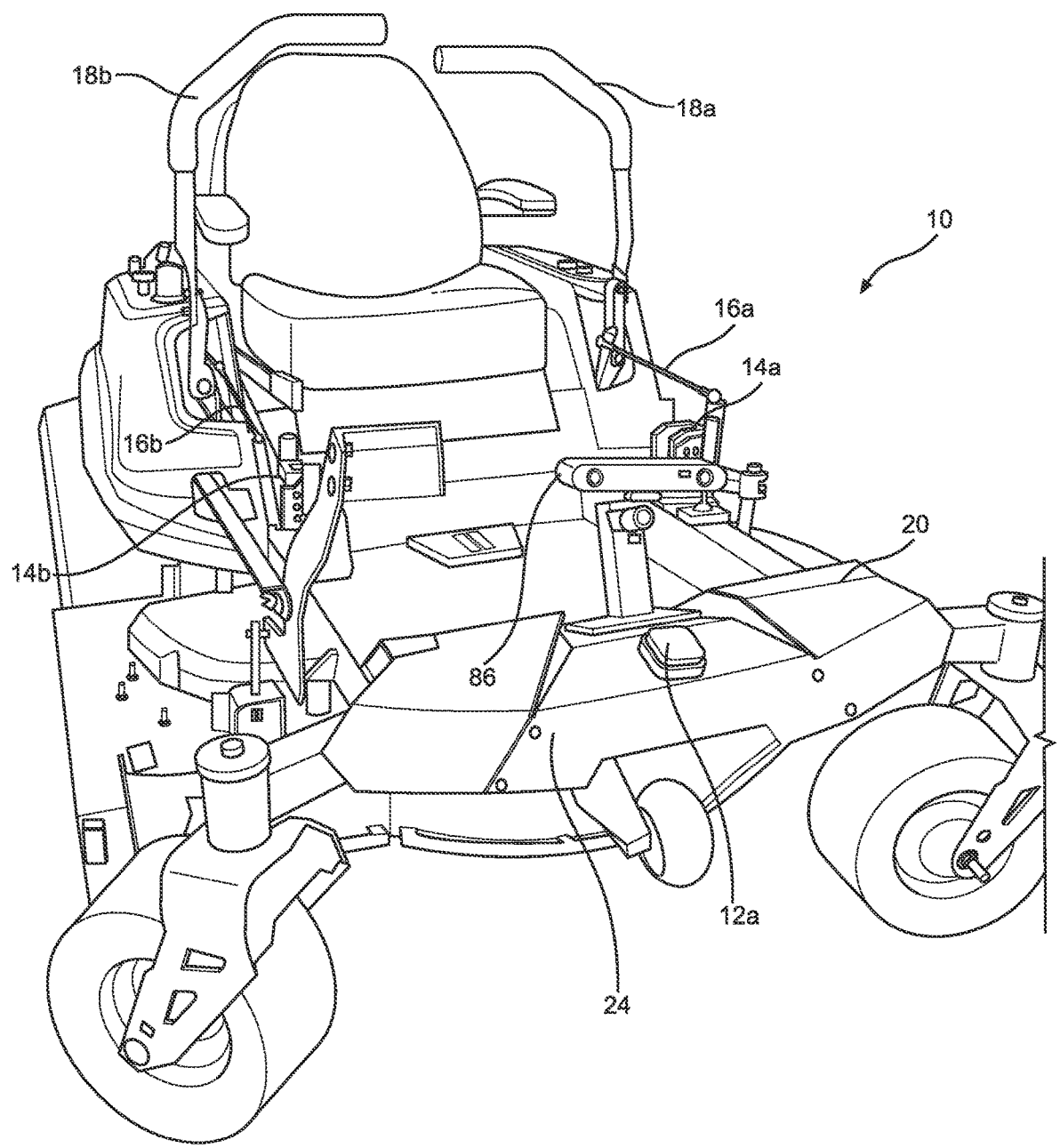
FIG. 1 is perspective view of a zero-turn mower including the autonomous mower conversion kit of the disclosure.
Figure 2:
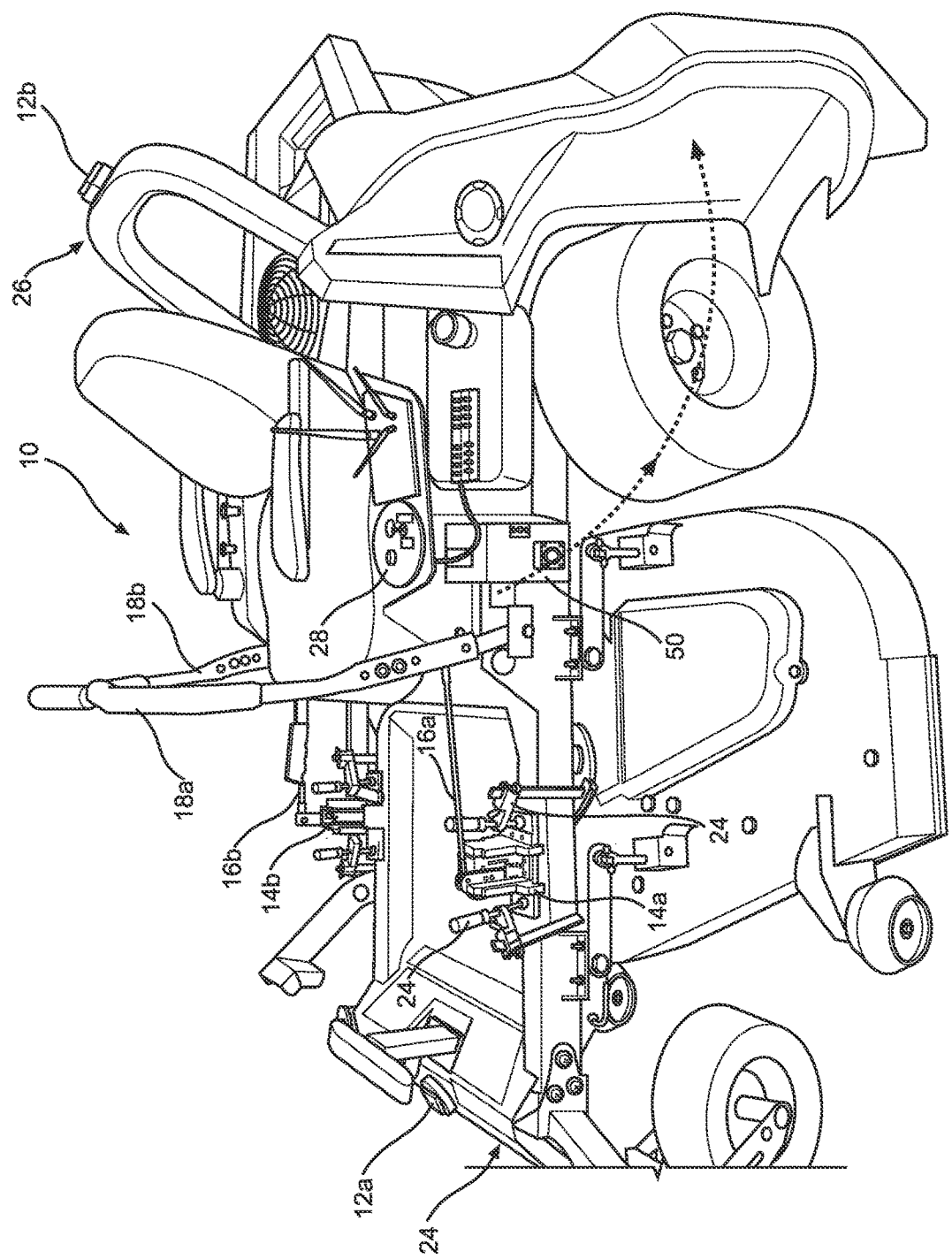
FIG. 2 is a left side perspective view of the zero-turn mower of FIG. 1 with the control system exposed.

With reference to FIGS. 1 and 2 there is illustrated a zero-turn mower 10 containing an autonomous conversion kit according to the disclosure as described in more detail below. The kit includes one or more GPS devices 12 and a pair of high torque servo motors 14a and 14b and a pair of tie rods 16a and 16b removably attached between the high torque servo motors 14a and 14b and the mower control arms 18a and 18b. The use of at least two GPS devices 12 may provide sufficient autonomous control of the mower 10 without the use of a separate magnetometer. The high torque servo motors 14a and 14b may be mounted to the mower housing 20 (FIG. 2) using temporary clamps 22 (FIG. 2), or may be bolted or otherwise permanently mounted to the mower housing 20. In some embodiments, the mower 10 includes two GPS devices, one GPS device 12a on the front 24 of the mower and a second GPS device 12b on the back 26 of the mower 10 (FIG. 2) to improve the positioning of the mower 10.

A switch panel 28 (FIG. 3) contains a master power switch 30 for powering a vehicle control unit, described in more detail below. The entire autonomous conversion kit, described herein, is powered off of a standard zero-turn mower battery (not shown). The master power switch 30 turns the vehicle control unit and servo motors 14a and 14b on/off. The mower 10 can be operated manually whether the switch is on or off as long as the tie rods 16a and 16b are disconnected from the servo motors 14a and 14b. The master power switch 30 only controls the autonomy hardware when the mower 10 is configured for autonomous operation.

Figure 3:
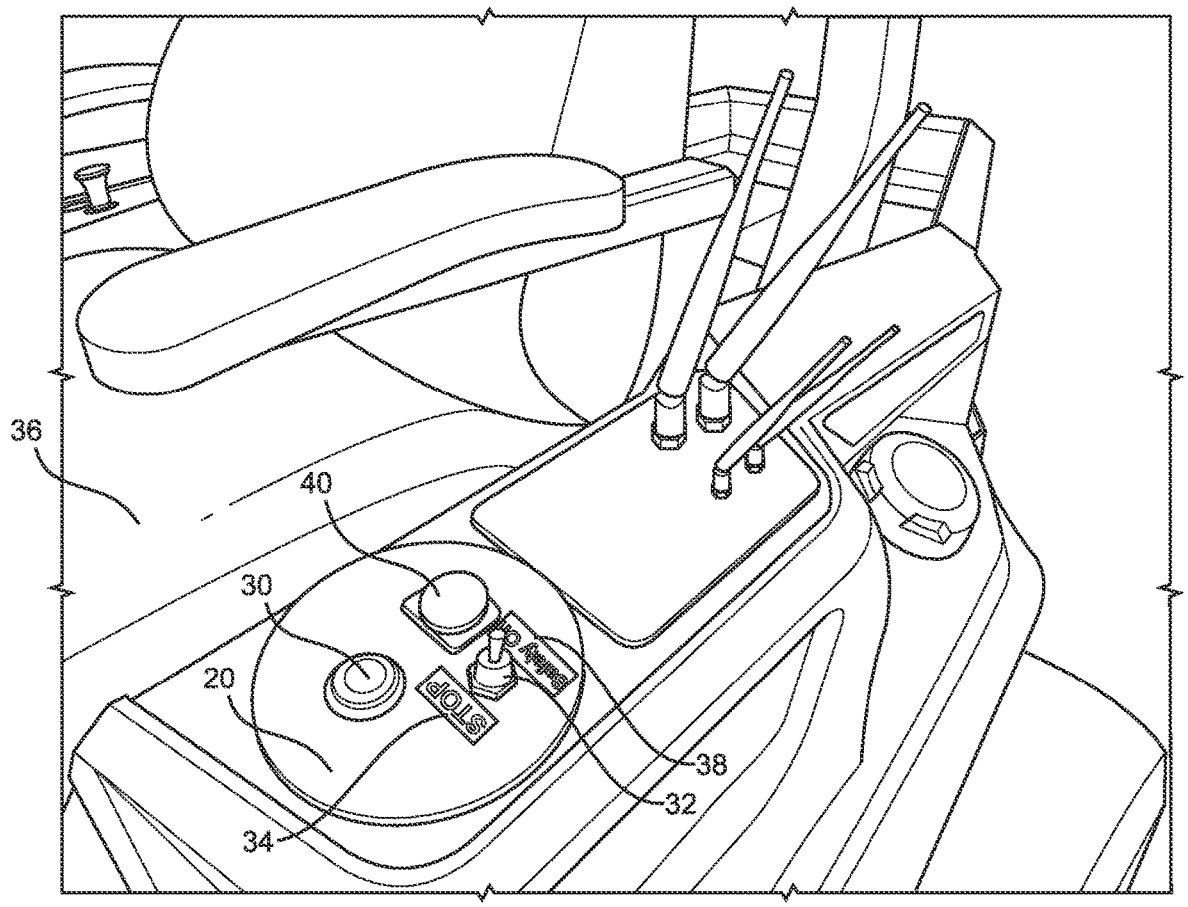
FIG. 3 is a close up perspective view of a switch panel for the mower of FIG. 1.

The switch panel 28 also contains a safety override switch 32 tied to the manufacturer's seat safety switch. Flipping the safety override switch 32 to a stop position 34 shuts down the mower 10 when a user is not situated on the seat 36. When the safety override switch 32 is in the override position 38 as shown in FIG. 3, the safety systems of the mower are inactive so that the mower can be operated in an autonomous mode when a user is not present on the seat 36. A USB port 40 is included on the switch panel 28 for reading and programming the vehicle control unit for the autonomous mower conversion kit.

Figure 4:
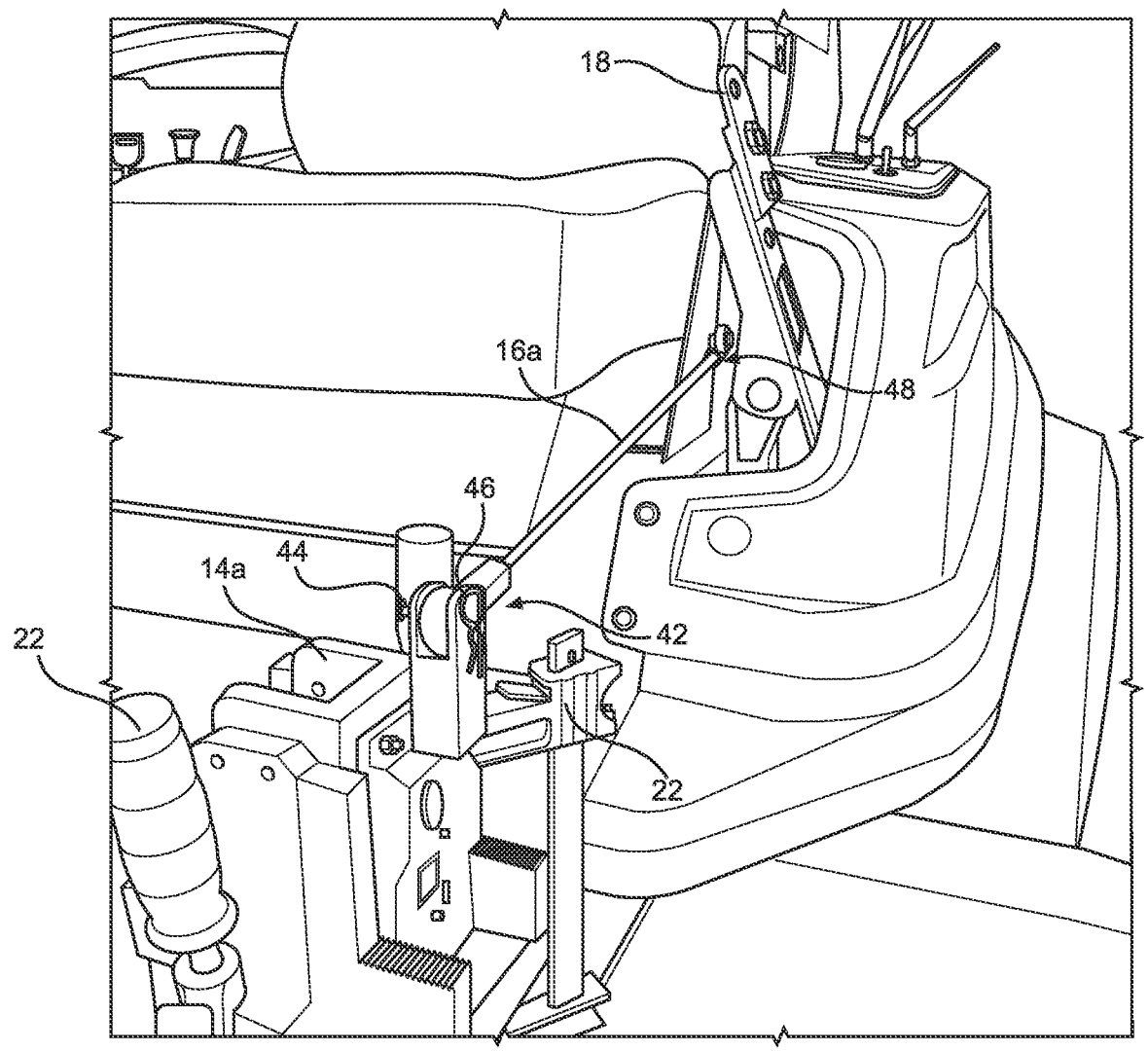
FIG. 4 is a perspective view of a removable tie rod attached on a first end to a high torque servo motor and attached on a distal end to a left side mower steering arm.
Figure 5:
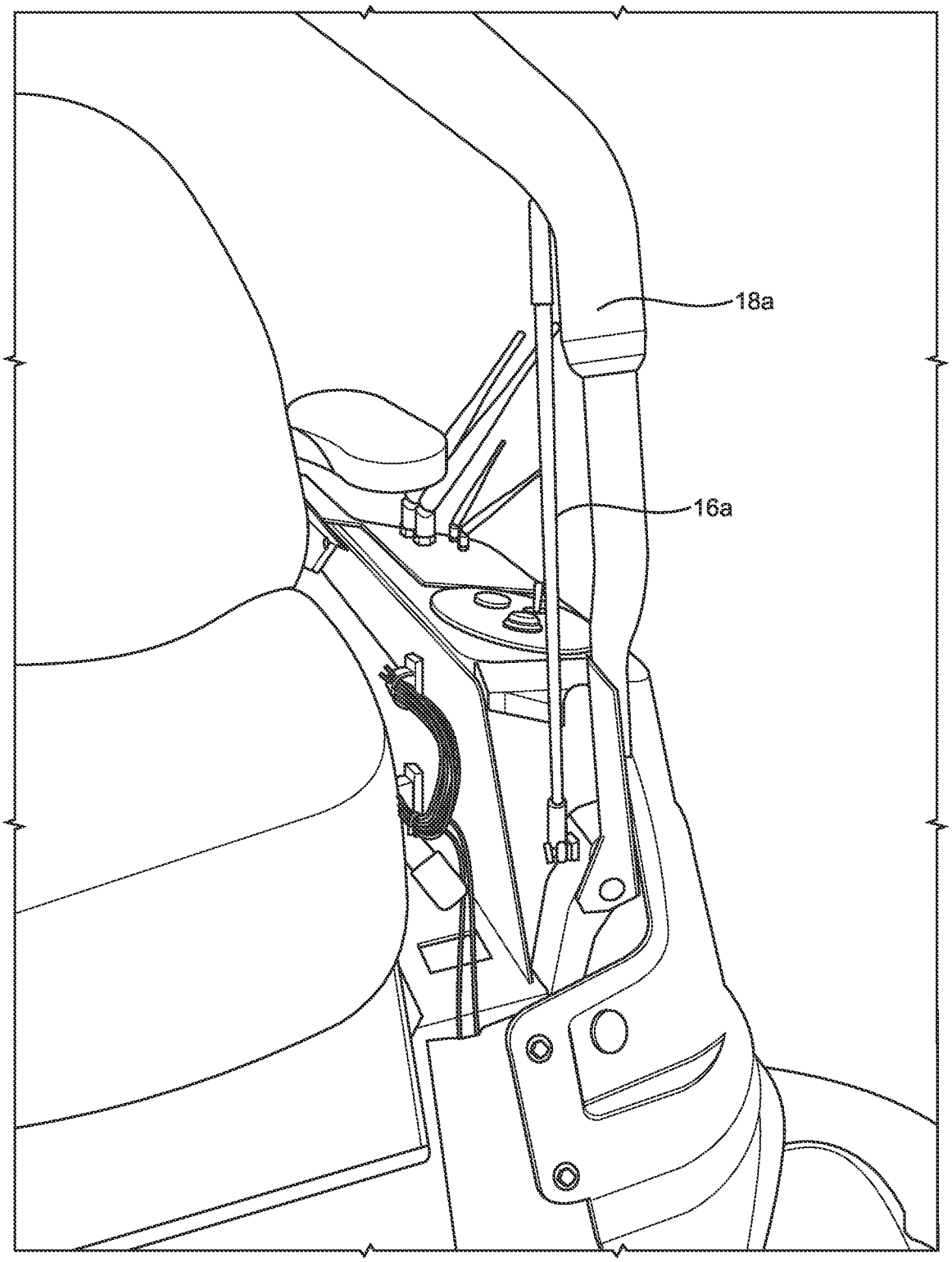
FIG. 5 is a perspective view of a tie rod disengaged with the high torque servo motor for the mower of FIG. 1.

An important component of the kit is the high torque servo motor 14a and tie rod 16a shown in more detail in FIG. 4. The high torque servo motor 14a is temporarily clamped to the housing 20 of the mower 10 using clamps 22. However, in some embodiments, the high torque servo motor can be removably attached to the mower housing 20 using bolts, or may be welded or otherwise permanently attached to the mower housing 20. A first end 42 of the tie rod 16a is attached by means of a removable pin 44 and cotter pin 46 to the high torque servo motor 14a. The distal end 48 of the tie rod 16a is pivotally attached to the control arm 18a of the mower. Activation of the high torque servo motors 14 causes the tie rods 16 to push or pull the mower control arms 18 in order to steer the mower 10. Referring to FIG. 5, when the cotter pin 46 and removable pin 44 are removed, the tie rods 16a and 16b may be pivoted away from the high torque servo motors 14a and 14b as shown so that the mower 10 can be manually operated, if desired.

Figure 6:
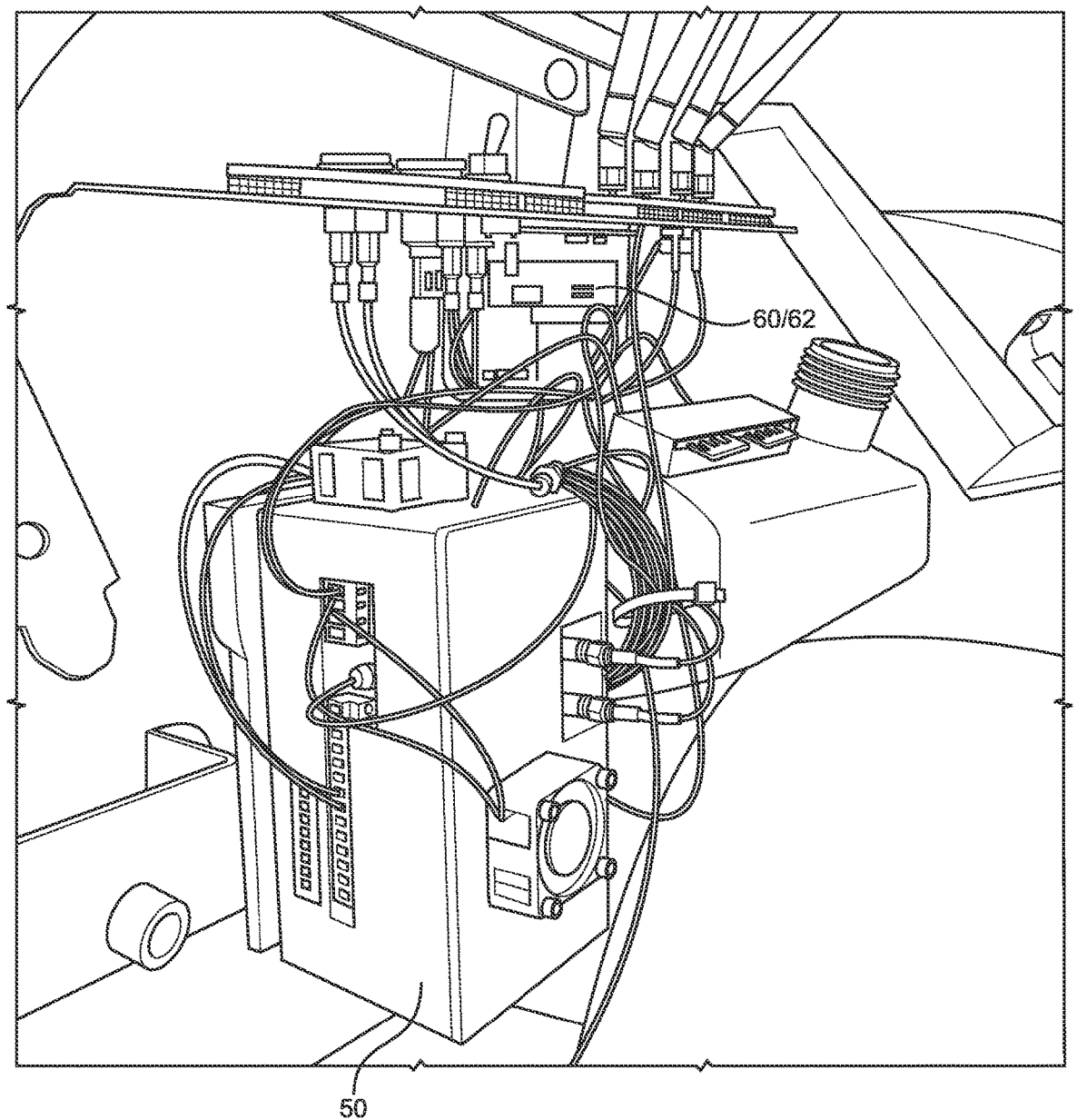
FIG. 6 is a left side elevation view of the vehicle control unit and cellular/radio modules for the mower of FIG. 1 mounted on the mower housing.
Figure 7:
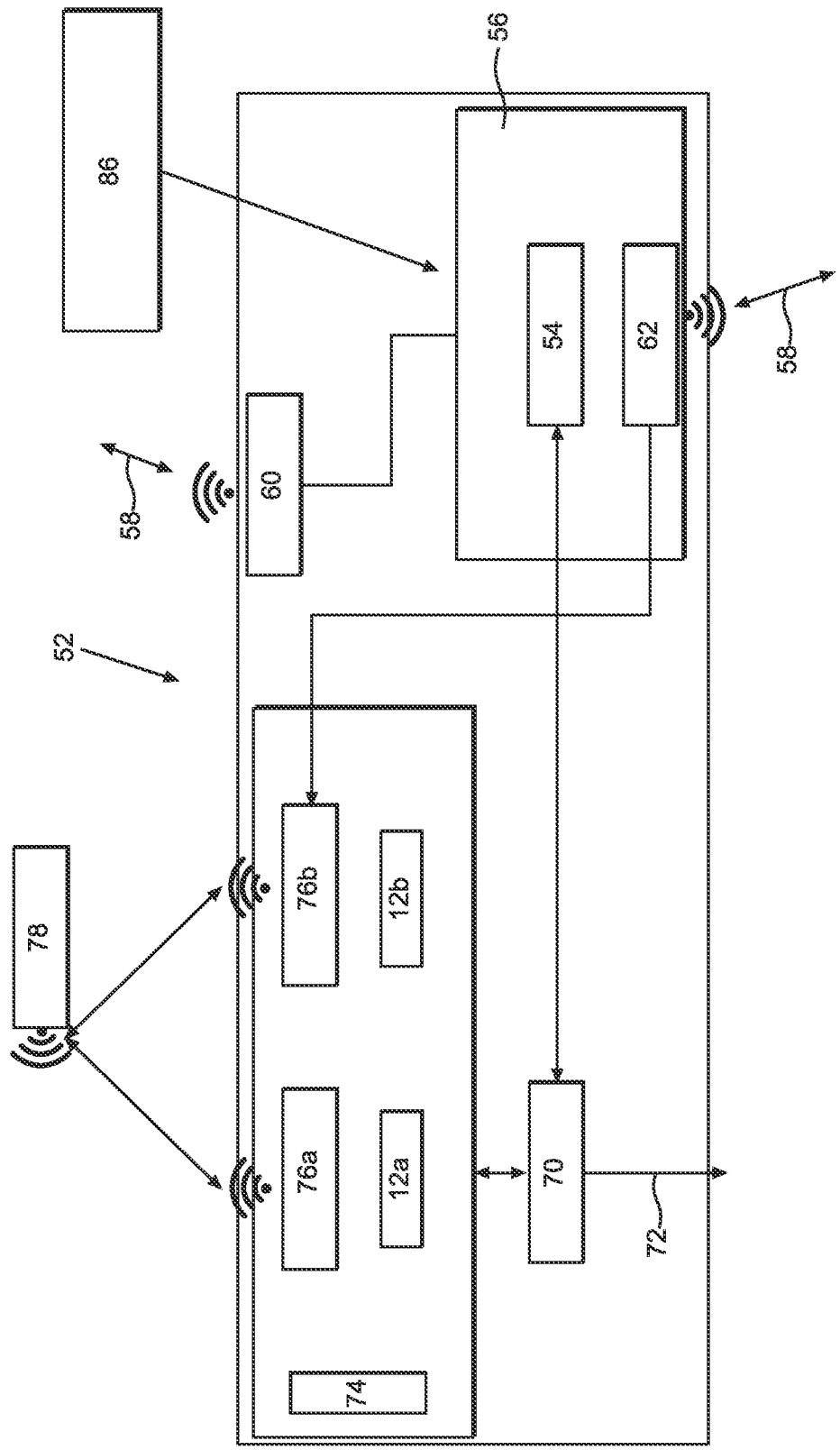
FIG. 7 is a schematic view of the circuit board in the vehicle control unit for the vehicle control unit of FIG. 6.
Figure 8:
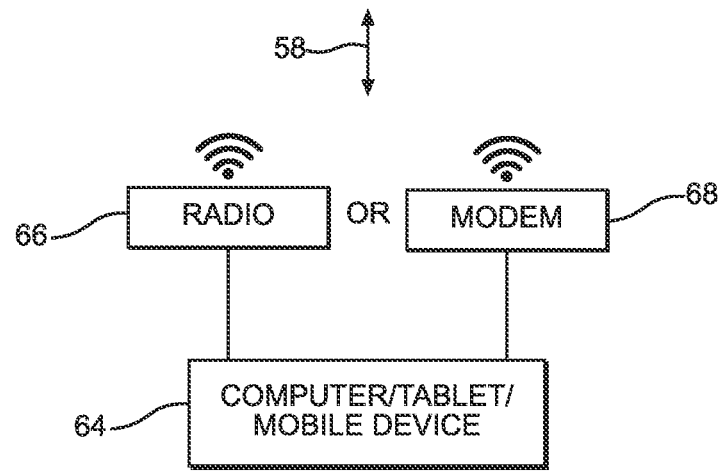
FIGS. 8 and 9 are schematic view of how GNSS correction data may be transmitted to the vehicle control unit of FIG. 6
Figure 9:
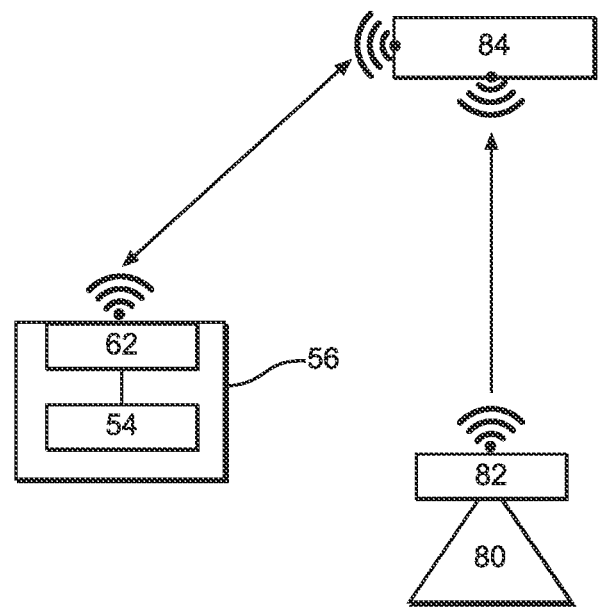

The main components of the vehicle control unit 50 for the autonomous mower conversion kit described herein are illustrated in FIGS. 6-8. A circuit board 52 in the vehicle control unit 50 includes a command input processor 54 in a command module 56 that sends and receives a signal 58 via a radio module 60 or cellular module 62 on the circuit to and from a mobile command processor 64 such as a computer, tablet, cell phone and the like (FIG. 8) via a radio signal device 66 or a modem 68. The radio module 60 may provide a radio signal in both a 900 Mhz and 2.4 Ghz range. The circuit board 52 also includes a navigation processor 70 that sends a signal 72 to the high torque servo motors 14a and 14b. The navigation processor 70 is in data communication with GPS devices 12a and 12b, an inertial measurement unit 74, and GNSS correction data receivers 76a and 76b. The GNSS correction data receivers 76a and 76b or the cellular module 62 are configured to transmit and receive GNSS correction data primarily from an L-band satellite 78. As a secondary option, if the L-band satellite 78 is not available, the GNSS correction data can be transmitted from a GNSS base station 80 via a cellular device 82 to an NTRIP Server, which in turn relays a data signal to the cellular module 62 that is in data communication with the command input processor 54 in the command module 56 on the circuit board 52 (FIG. 9). The command module 56 is also in data communication with one or more obstacle detection devices 86 such as cameras (FIG. 1), sensor, or radar device on the mower 10 that is configured to prevent the mower from striking an obstacle when in the autonomous mode. Accordingly, the radio module 60 and the cellular module 62 enable worldwide communication with the vehicle control unit 50 for autonomous control of the mower 10.

Figure 10:
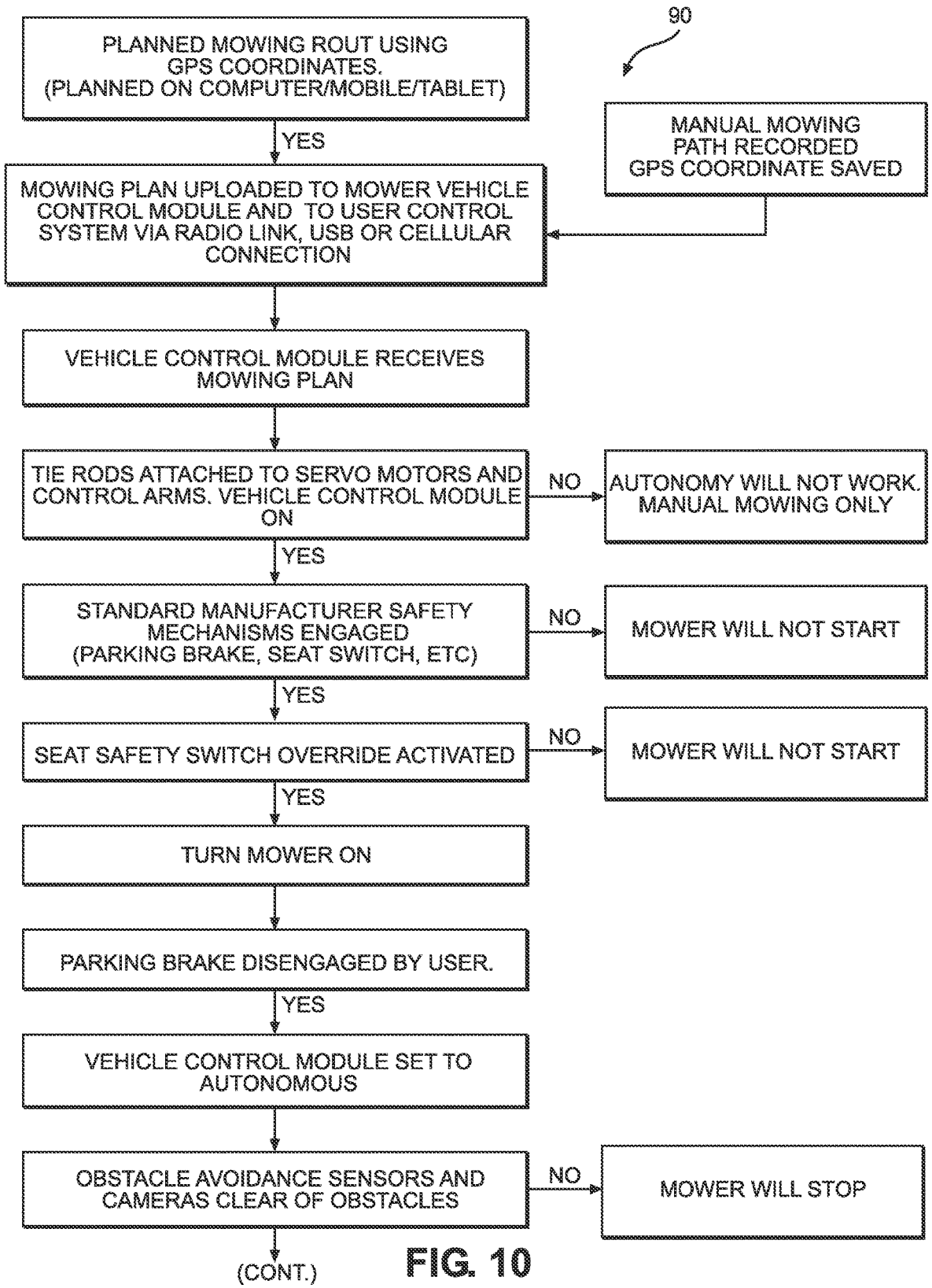
FIG. 10 is a block flow diagram for controlling the mower of FIG. 1 using the autonomous mower control kit.
Figure 10:
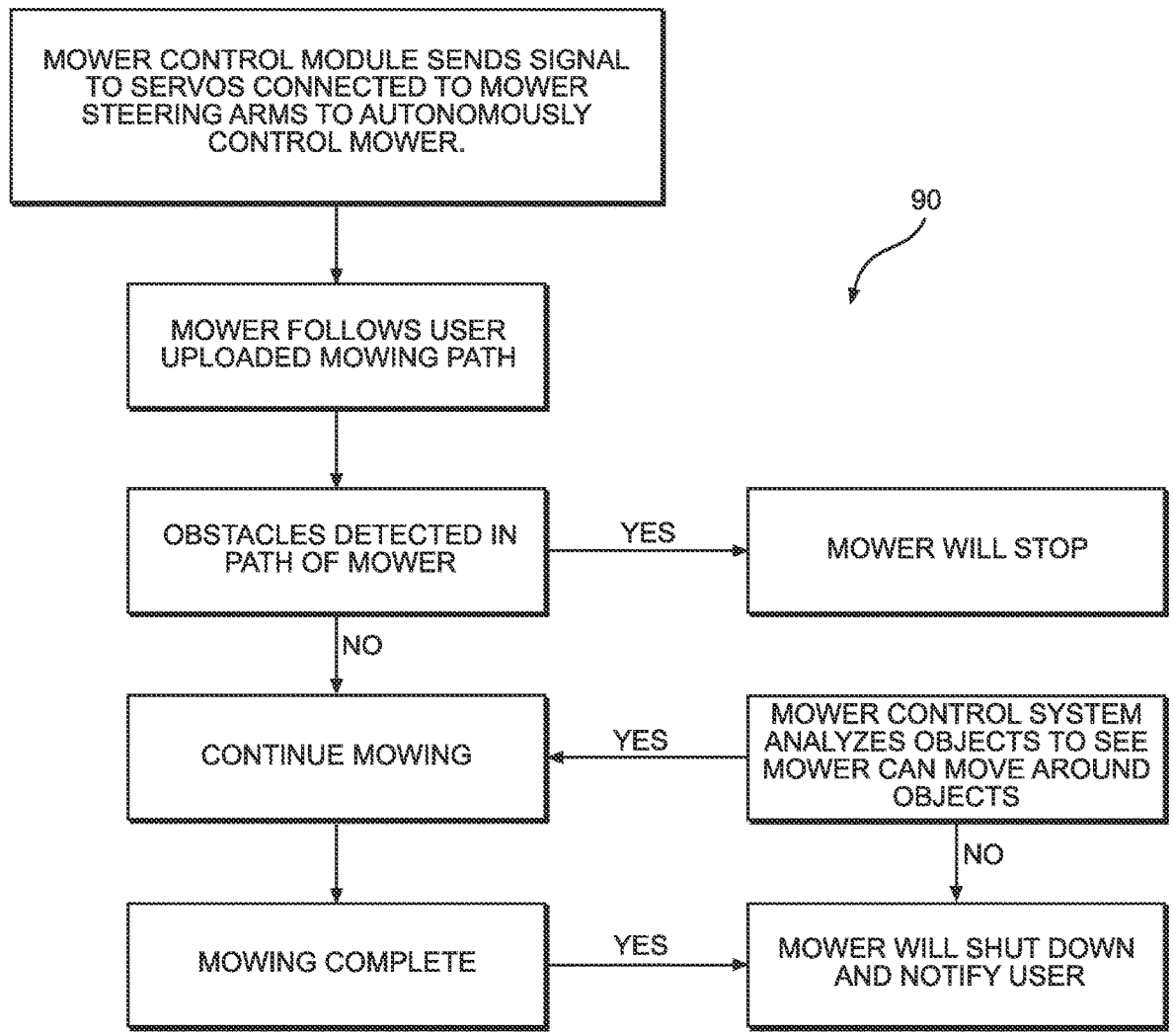
Figure 11:
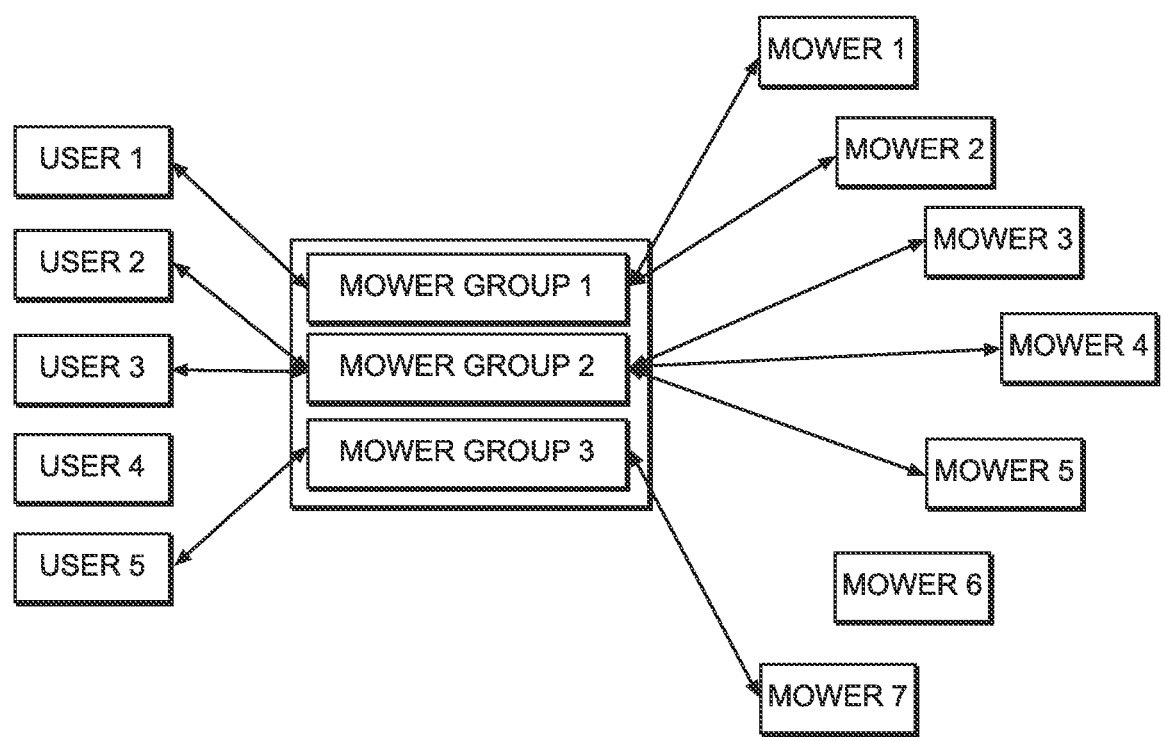
FIG. 11 is an illustration of the use of a control system using the control unit described herein to control multiple autonomous mowers.

Cellular connectivity to the control unit 50 enables the option to control and monitor multiple mowers as shown in FIG. 11. The GPS devices 12a and 12b provide positioning of the mower within coordinates selected by a user and input to the control unit 50. The control unit 50 is programmed to send outputs to the high torque servo motors 14a and 14b in order to control the mower control arms 18a and 18b used to position the mower 10. In some embodiments, the obstacle detection device 86 uses cameras and sensors on the mower 10 to provide input to the command module 56 to enable the mower 10 to avoid obstacles in the area to be mowed. A simplified block flow diagram 90 for the mower 10 in manual or autonomous control is illustrated in FIG. 10.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An autonomous mower conversion kit comprising:
    a vehicle control unit comprising a navigation processor in data communication with one or more global positioning (GPS) devices configured for inputting GPS coordinates to the navigation processor, wherein the navigation processor is configured to send a signal to a pair of high torque servo motors attached to a housing of a zero-turn mower, each of the pair of high torque servo motors having a tie rod removably attached on a first end to one of the pair of high torque servo motors and on a distal end to a mower steering arm; and
    a safety override switch connected to the vehicle control unit is configured for converting the zero-turn mower to autonomous control.

2. The autonomous mower conversion kit of claim 1, wherein the tie rod is removably attached on the first end to the high torque servo motor using a removable pin and cotter pin.

3. The autonomous mower conversion kit of claim 1, wherein the tie rod is removably attached on the distal end to the zero-turn mower steering arm using a swivel joint.

4. The autonomous mower conversion kit of claim 1, further comprising a cellular module in data communication with a command module in the vehicle control unit, wherein the cellular module is configured for inputting mowing instructions to the navigation processor from anywhere in the world.

5. The autonomous mower conversion kit of claim 1, further comprising a radio module in data communication with a command module in the vehicle control unit, wherein the radio module is configured for inputting mowing instructions to the navigation processor from the command module when located within range of the radio module.

6. The autonomous mower conversion kit of claim 1, further comprising a USB port connected to the vehicle control unit, wherein the USB port is configured for reading and inputting programming information to a command module in the vehicle control unit.

7. The autonomous mower conversion kit of claim 1, wherein the safety override switch electrically connected to a mower shutdown system, wherein the safety override switch is configured to prevent the zero-turn mower from shutting down when a user is not seated on the zero-turn mower.

8. The autonomous mower conversion kit of claim 1, wherein the autonomous mower conversion kit further comprises at least two GPS devices positioned on opposite ends of the zero-turn mower having inputs to the command module.

9. The autonomous mower conversion kit of claim 1, the autonomous mower conversion kit further comprises an obstacle avoidance system having an input to the command module.

10. The autonomous mower conversion kit of claim 1, wherein the pair of high torque servo motors are configured to be removably attached to the housing of the zero-turn mower.

11. The autonomous mower conversion kit of claim 1, wherein the pair of high torque servo motors are configured to be permanently attached to the housing of the zero-turn mower.

12. A method for autonomously controlling a zero-turn mower, comprising:
    attaching an autonomous mower conversion kit to the zero-turn mower, the autonomous mower conversion kit comprising:
        a vehicle control unit comprising a navigation processor is in data communication with one or more global positioning (GPS) devices configured for inputting GPS coordinates to the navigation processor, wherein the navigation processor is configured to send a signal to a pair of high torque servo motors attached to a housing of the zero-turn mower, each of the pair of high torque servo motors having a tie rod removably attached on a first end to one of the pair of high torque servo motors and on a distal end to the zero-turn mower steering arm; and
        a safety override switch connected to the vehicle control unit is configured for converting the zero-turn mower to autonomous control;
    planning a mower route;
    inputting the mowing route to the vehicle control unit;
    activating the safety override switch;
    turning the zero-turn mower on; and
    setting the zero-turn mower for autonomous control.

13. The method of claim 12, wherein the tie rod is removably attached on the first end to the high torque servo motor using a removable pin and cotter pin before activating the safety override switch.

14. The method of claim 12, wherein the mowing route is input to the vehicle control unit using a cellular module in data communication with a command module in the vehicle control unit.

15. The method of claim 12, wherein the mowing route is input to the vehicle control unit using a radio module in data communication with a command module in the vehicle control unit.

16. The method of claim 12, wherein the onboard controller comprises a USB port connected to the vehicle control unit, the USB port being configured for reading and inputting programming information to a command module in the vehicle control unit.

17. The method of claim 12, wherein the autonomous mower conversion kit comprises at least two GPS devices positioned on opposite ends of the zero-turn mower having inputs to the processor.

18. The method of claim 12, wherein the autonomous mower conversion kit comprises an obstacle avoidance system having an input to a command module in the vehicle control unit.

19. The method of claim 12, wherein the pair of high torque servo motors are removably attached to the housing of the zero-turn mower.

* * * * *